No. 769,282.

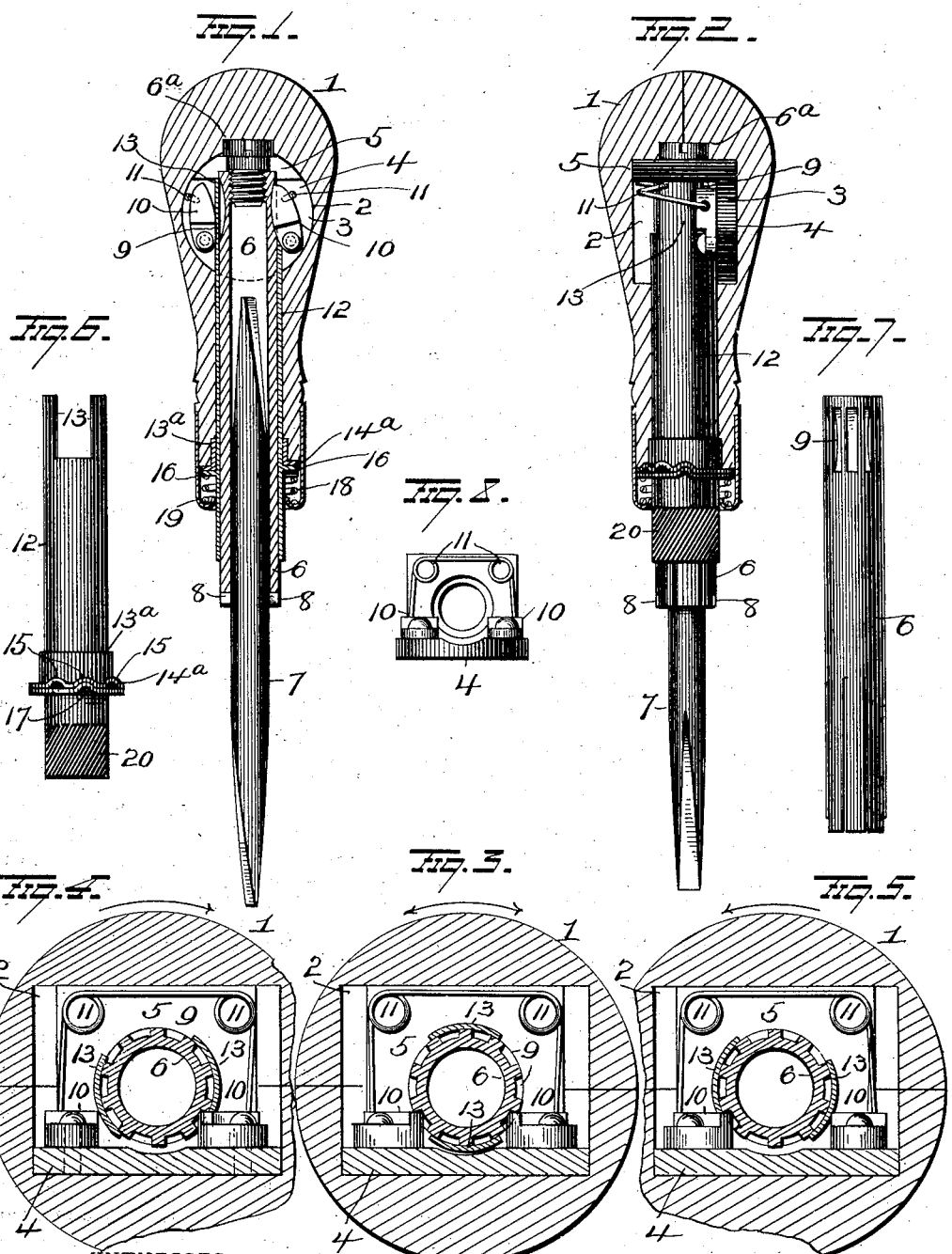

Patented September 6, 1904.

UNITED STATES PATENT OFFICE.

WILLIAM B. SWAN, OF SEYMOUR, CONNECTICUT.

TOOL-HANDLE.

SPECIFICATION forming part of Letters Patent No. 769,282, dated September 6, 1904.

Application filed January 11, 1904. Serial No. 188,643. (No model.)

*To all whom it may concern:*

Be it known that I, WILLIAM B. SWAN, a resident of Seymour, in the county of New Haven and State of Connecticut, have invented certain new and useful Improvements in Tool-Handles; and I do hereby declare the following to be a full, clear, and exact description of the invention, such as will enable others skilled in the art to which it appertains to make and use the same.

My invention relates to an improvement in tool-handles, and more particularly to double-ratchet screw-drivers, or rather to handles therefor, with improved means for shifting the operation of the ratchet mechanism and to an improved handle formation; and it consists in certain novel features of construction and combinations and arrangements of parts, as will be more fully hereinafter described, and pointed out in the claims.

In the accompanying drawings, Figure 1 is a view in longitudinal section illustrating my improvements. Fig. 2 is a view partially in longitudinal section at right angles to Fig. 1 and partly in elevation. Figs. 3, 4, and 5 are views in cross-section, showing the parts in their three different adjustments; and Figs. 6, 7, and 8 are views of details of construction.

1 represents a handle comprising two or more sections cemented or otherwise secured together and having recesses to form a pocket 2, in which a metal bracket 3 is located, supporting my improved ratchet mechanism and comprising a base-plate 4 and end wall 5 at right angles thereto. A screw $6^a$ is located in an opening in end wall 5 and screwed into a tool-holding tube 6, the outer end of which latter being split longitudinally, forming spring-jaws to clamp a tool 7, preferably of the double-ended type, in position, and said tool is made with lugs 8 on opposite sides to enter notches in the end of the tube and compel them to turn together. The inner end of tube 6 is provided with an annular series of notches or ratchet-teeth 9, and on base-plate 4, at opposite sides of the tube, dogs 10 are pivoted and held in engagement with the ratchet-teeth by a spring 11, connected at its ends with both dogs, coiled at two points between its ends and extending above and across the tube 6.

To govern the operation of the dogs 10, a sleeve 12 is provided around tube 6 and made at its inner end at opposite sides with tongues 13, one of which is normally located between the dogs 10, as shown in Fig. 3, and when in such position both dogs are in engagement with the ratchet-teeth 9 and tube 6 is locked against turning in either or both directions. When, however, the sleeve 12 is turned in one direction, as shown in Fig. 4, one dog 10 is held out of operation, and the tube is free to turn in one direction, and when the sleeve is thrown to the other reverse or extreme position the other dog is held out of operation while the former inactive dog comes into action, thus enabling the operator to adjust the tool to operate in either direction or lock in both directions.

In the end of handle 1 a collar $13^a$ is fixed and made with a ring or disk $14^a$, held against the end of handle 1 and having three recesses or depressions 15. A corresponding ring or disk 16 is fixed on sleeve 12 and made with a single lug 17 to enter any of said recesses 15. Ring or disk 16 is held against ring or disk 14, with its lug 17 in one of the recesses 15, by means of a coiled spring 18, surrounding sleeve 12 and bearing at its respective ends against ring or disk 16 and the inwardly-turned end of a ferrule 19, inclosing the end of handle 1. The outer end of sleeve 12, which projects beyond ferrule 19, is roughened, as shown at 20, to facilitate its being moved when grasped between the fingers, and the operation of my improvement is as follows: When lug 17 is in the central recess 15, tongue 13 will be in the position shown in Fig. 3, and both dogs 10 will be in engagement with ratchet-teeth 9, and the handle will be locked to tube 6, permitting no ratchet movement whatever. When it is desired to drive in a screw, the operator first pulls sleeve 12 slightly outward to remove lug 17 from the central recess and then turns the sleeve until lug 17 springs into an end recess, when the tongue will be in the position shown in Fig. 4, and by throwing the sleeve to the opposite extreme position the parts will be in the position shown in Fig. 5, compelling the other dog 10 to act alone. By this arrangement of parts the adjustment of the tool is always accurate and can be instantly accomplished without possibility of the parts becoming displaced during their operation.

A great many slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a hollow tool-handle, of a tool-holding tube adapted to grasp a tool, inserted in said handle, ratchet-teeth on said tube, dogs engaging said ratchet-teeth, a sleeve on said tube having a tongue adapted to throw either of said dogs out of operation or lie inactive between them, a ring or disk fixed to the lower end of the handle and having three recesses therein, a ring or disk secured to the lower portion of the sleeve and having a lug thereon, and a spring at the lower end of the handle holding said rings or disks in contact with the lug in one of said recesses to lock the sleeve in any one of three positions.

2. The combination with a hollow tool-handle, of a tool-holding tube in said handle having ratchet-teeth thereon, dogs engaging said ratchet-teeth on opposite sides of the tube, a sleeve on the tube having a tongue thereon adapted to hold either of said dogs out of operation or lie inactive between them, and cooperating means between the lower end of the handle and sleeve for locking said sleeve in all three of its adjustments, and a spring at the lower end of the handle and engaging said locking means.

3. The combination with a hollow tool-handle, of a tool-holding tube in said handle having ratchet-teeth thereon, dogs engaging said ratchet-teeth at opposite sides of the tube, a sleeve on the tube having a tongue thereon adapted to hold either of said dogs out of operation or lie inactive between them, a ring or disk secured to the lower end of the handle and having three recesses therein, a ring or disk on the sleeve adjacent to its lower end and having a lug thereon to enter any of said recesses, a ferrule on the handle having an inturned flange at its end and a coiled spring on the sleeve between the inturned flange of the ferrule and last-mentioned ring or disk.

In testimony whereof I have signed this specification in the presence of two subscribing witnesses.

WILLIAM B. SWAN.

Witnesses:
J. B. MAYNARD,
NORMAN W. LOUNSBURY.